United States Patent [19]

Shinozuka et al.

[11] Patent Number: 4,505,755

[45] Date of Patent: Mar. 19, 1985

[54] METHOD OF PRODUCING SURFACE-TREATED BARIUM SULFATE

[75] Inventors: Kiyoshi Shinozuka; Koichi Otu; Hiroshi Fukumoto, all of Iwaki, Japan

[73] Assignee: Onahama Sakai Kagaku Kabushiki Kaisha, Japan

[21] Appl. No.: 486,962

[22] Filed: Apr. 20, 1983

[30] Foreign Application Priority Data

Dec. 28, 1982 [JP] Japan .............................. 57-229842
Dec. 28, 1982 [JP] Japan .............................. 57-229843

[51] Int. Cl.$^3$ ....................... C01G 23/06; C08G 41/02
[52] U.S. Cl. ............................... 106/308 B; 106/291; 106/308 Q; 106/306
[58] Field of Search ................ 106/308 B, 291, 308 G

[56] References Cited

U.S. PATENT DOCUMENTS 3,840,381  10/1974  Watanabe ............................ 106/291

FOREIGN PATENT DOCUMENTS 1279672  6/1972  United Kingdom ................ 106/300

Primary Examiner—John Kight
Assistant Examiner—Marvin L. Moore
Attorney, Agent, or Firm—Wenderoth, Lind & Ponack

[57] ABSTRACT

A method of producing surface-treated barium sulfate is disclosed which has an improved dispersibility in resins and coating compositions. The method comprises adding an aqueous solution of an alkali silicate to an aqueous slurry of barium sulfate which contains barium ion in excess to deposit barium silicate on the surface of barium sulfate, and then adding to the slurry a mineral acid to decompose the barium silicate to hydrous silica. The thus surface-treated barium sulfate may be further coated with hydrous metal oxides such as alumina or with a silane coupling agent so as to have a more improved dispersibility.

12 Claims, No Drawings

METHOD OF PRODUCING SURFACE-TREATED BARIUM SULFATE

The present invention relates to a method of producing surface-treated barium sulfate which has an improved dispersibility in resins and organic vehicles.

In general, barium sulfate is produced by the reaction of a barium salt such as sulfide, chloride or nitrate with sulfuric acid or its salt such as sodium sulfate in an aqueous solution. This reaction generally provides spherical barium sulfate which is usually from 0.3 to 2 microns in the primary particle size. The barium sulfate thus produced is filtered off, washed with water, dried and pulverized for various use. It is well known in the art that the barium sulfate particles aggregate to larger secondary particles of several to several tens of microns in the course of drying and pulverizing, and the smaller the primary particle size, the larger the secondary particle size on account of a larger cohesive force between the particles. In particular, the primary particles not more than 0.1 microns in particle size form a hard dried cake after filtering and drying, and the cake provides large secondary particles several tens to several hundreds of microns in particle size when pulverized by a usual pulverizer, for example, a hammer mill. Such large particles of barium sulfate are lacking in dispersibility in resins and organic vehicles. Accordingly, when being used in resin moldings, the particles are clearly perceived as aggregates by the naked eye, and when being used in coating compositions, the particles cause the turbidity in the resulting coating. The primary particles of about 0.05 microns or less in particle size form a much harder cake, and the secondary particles therefrom are too large to use as an extender pigment. Even the pulverizing of the cake by a powerful jet mill using high pressure air or steam results only in a stronger cohesion of secondary particles.

The use of barium sulfate as an extender or filler is based upon its chemical and physical stability which makes the surface thereof inactive. Therefore, as another difficulty in using barium sulfate as an extender, barium sulfate is by nature not readily dispersible in resins and organic vehicles.

Therefore, an object of the invention is to obviate the above difficulties and to provide a method of surface-treated barium sulfate which is small in particle size and which has an improved dispersibility, and hence especially suited for use as an extender and a filler.

The method of producing surface-treated barium sulfate of the invention comprises:

adding an aqueous solution of an alkali silicate to a feed aqueous slurry of barium sulfate which contains barium ion in excess, the alkali silicate added being in amounts of 0.1–30% by weight in terms of silica based on the weight of barium sulfate in the slurry, to deposit barium silicate on the surface of barium sulfate, and then adding a mineral acid to the resultant slurry and adjusting it at a pH not larger than 7 to decompose the barium silicate to hydrous silica.

Other objects and features of the invention will appear in the course of the description thereof which follows.

The aqueous feed slurry of barium sulfate which contains barium ions in excess may be prepared preferably by the reaction of barium sulfide with sulfuric acid or its water-soluble salt such as sodium sulfate in an aqueous solution in the presence of excess amounts of barium ions. Therefore, this aqueous solution reaction may be carried out in the presence of excess amounts of barium sulfide in relation to sulfuric acid or its salt. The excess amounts of barium sulfide may be replaced by other water-soluble barium salts such as barium chloride or nitrate. Although not critical, barium ion is usually present in the solution reaction in excess from 0.1 to 20 mole % based on the stoichiometric amount, and preferably from 1 to 10 mole %. As will be apparent, the excess barium ions remain after the reaction to provide an aqueous feed slurry of barium sulfate which contains barium ions in excess.

On the other hand, when the aqueous solution reaction is carried out stoichiometrically or nearly so, or in the acidic conditions in the presence of excess amounts of sulfuric acid, water-soluble barium, compounds such as barium sulfide and barium nitrate are dissolved in the resultant slurry of barium sulfate after the reaction so as to provide a feed slurry containing barium ions in excess.

The aqueous solution reaction is carried out usually at temperatures not lower than 40° C., and preferably between 60° C. and 90° C. The feed aqueous slurry is so prepared preferably as to contain barium sulfate in amounts of 70–150 g/l from the viewpoint of process economy, although not critical.

When necessary, a feed slurry may be prepared by suspending pulverized barium sulfate in water and then adding thereto a water-soluble barium compound as previously referred to.

As will be fully described later, in the method of the invention the excess barium ions in the feed slurry are reacted with an alkali silicate to form barium silicate on the surface of barium sulfate in the slurry. Therefore, when the slurry contains barium ions only in a slight excess, insufficient amount of barium silicate deposits on the surface of barium sulfate, whereas when the slurry contains too large an excess of barium ions, a large amount of barium sulfate is newly produced in the decomposition reaction of barium silicate by sulfuric acid to hydrous silica, also as will be fully described later, and the barium sulfate thus obtained has a low dispersibility as a whole. Therefore, it is preferable that the feed slurry contain barium ions in amounts from 0.1–20 mole %, most preferably 1–10 mole %, based on the barium sulfate in the slurry.

According to the invention, an aqueous solution of alkali silicate, preferably of sodium silicate or potassium silicate, is added to the aqueous feed slurry of barium sulfate to deposit barium silicate on the surface of barium sulfate in the slurry. The alkali silicate is used in amounts of 0.1–30% by weight, preferably 1–20% by weight, in terms of silica, $SiO_2$, based on the weight of barium sulfate in the slurry so that the excess barium ions in the slurry react with the alkali silicate to form a uniform coating of barium silicate on the surface of barium sulfate in the slurry.

When too small an amount of alkali silicate is used in relation to the barium sulfate in the slurry, a uniform coating of barium sulfate with barium silicate is not attained, whereas when too large an amount is used, an excess amount of hydrous silica is produced when barium silicate is decomposed by a mineral acid added to the slurry after the decomposition of barium silicate on barium sulfate, and the excess hydrous silica may cause the aggregation of barium sulfate particles to undesired larger particles.

According to the invention, a mineral acid is then added to the aqueous slurry to hydrolyze the barium silicate on the surface of barium sulfate to form a coating of hydrous silica, which may be represented by $SiO_2 \cdot nH_2O$. Among mineral acids are preferably used hydrochloric acid and nitric acid since these acids produce no water-insoluble barium salts in the presence of barium ions in the slurry, however, sulfuric acid may also be used if necessary. Since the hydrolysis reaction of barium silicate occurs at a pH not higher than about 7, the slurry is usually adjusted to a pH of 2–7, and preferably 5–7 in order to provide barium sulfate particles having a pigment pH of about 6–8. The hydrolysis reaction may be carried out at temperatures of about 40° C. or higher, and preferably at temperatures from 60° C. to 90° C.

The barium sulfate particles thus surface-treated are readily filtered, and a cake therefrom provides secondary particles small in particle size and excellent in the dispersibility in resins and organic vehicles even when the primary particles of barium sulfate prepared in the aqueous solution reaction are 0.5 microns or less in average particle size.

According to the invention, the barium sulfate thus surface-treated may be further coated with hydrous metal oxides such as hydrous alumina and hydrous titania so as to have a more improved dispersibility. This coating of barium sulfate with hydrous metal oxides is accomplished according to the invention by adding an aqueous solution of a water-soluble metal compound to the aqueous slurry of barium sulfate having a coating of hydrous silica thereon, and then neutralizing the metal compound with an alkali or an acid depending on the metal compound used to water-insoluble hydrous metal oxides. The water-soluble metal compound is used in amounts of 0.1–30% by weight in terms of anhydrous metal metal oxide thereof based on the weight of barium sulfate in the slurry. The amount of 1–20% by weight in terms of anhydrous metal oxide based on barium sulfate is most preferred.

The alkali or acid which is used to decompose the water-soluble metal compound is selected depending on the metal compound used, and is not specifically limited. However, alkalis such as sodium hydroxide, potassium hydroxide and ammonia, or acids such as hydrochloric acid and nitric acid are preferably used in amounts sufficient to decompose the water-soluble metal compound to form a water-insoluble coating of hydrous metal oxide on the surface of barium sulfate. Good results are usually obtained when the alkali or acid is added to the slurry to adjust it to a pH of 6–8. The decomposition reaction may be also carried out at temperatures of 40° C. or higher, and preferably at temperatures of 60° C. to 90° C., although not critical.

The water-soluble metal compound used in the invention includes compounds of magnesium, aluminum, zirconium, titanium and zinc. Typical examples are sulfates, chlorides and nitrates. Water-soluble basic salts such as titanyl sulfate and complex salts such as sodium aluminate may also be preferably used in the invention.

According to the invention, since barium sulfate is in advance coated with hydrous silica, a uniform and tight coating of hydrous metal oxides is formed possibly through the reaction of hydrous silica with the metal oxides formed, to further improve the dispersibility of barium sulfate in resins and organic vehicle compositions as well as the filterability from the aqueous slurry. On the other hand, barium sulfate, which has no coating of hydrous silica, has little affinity with hydrous metal oxides formed so that the metal oxides precipitate independently without depositing on the surface of barium sulfate, thus causing no improvement in the dispersibility thereof.

Alternatively, barium sulfate having a coating of hydrous silica thereon may be treated with a silane coupling agent so as to have a more improved dispersibility in resins and coating compositions. Preferably a silane coupling agent is added to the aqueous slurry of barium sulfate successively after the decomposition of barium silicate to hydrous silica from the viewpoint of process economy. However, powders of barium sulfate may be directly treated with a silane coupling agent. The silane coupling agent is used in amounts of 0.01–5% by weight, preferably 0.05–2% by weight based on the weight of the barium sulfate.

The silane coupling agent is already known, and most of the agents have the general formula

$$X\text{-}Si(OR)_3$$

wherein X represents an organic group containing an alkyl, a vinyl, an acryloxy, a methacryloxy, an amino, an epoxy, a mercapto, a halogen, for example, and R represents an alkyl. Therefore, some examples of the agent usable in the invention are vinyltrimethoxysilane, γ-anilinopropyltrimethoxysilane, methyltrimethoxysilane, γ-methacryloxypropyltrimethoxysilane and γ-glycidoxytrimethoxysilane.

According to the invention, since barium sulfate has, in advance, a coating of hydrous silica thereon, the silane coupling agent reacts with hydroxyls of the silica, thereby to provide a uniform and tight coating of the agent. However, barium sulfate having no coating of hydrous silica is little improved in the dispersibility by the treatment possibly because of substantially no formation of binding between the inactive surface of barium sulfate and silane coupling agent.

The barium sulfate thus having a coating of hydrous silica or a further coating either of hydrous oxides of metals or of silane coupling agent is filtered off, dried and pulverized for use. The barium sulfate particle about 0.5 microns in primary particle size or less, and even 0.1 micron or less, is readily filtered but also forms a cake which is pulverizable to finely divided particles by a conventional pulverizing means such as a jet mill. Therefore, the particles have improved dispersibility in resins and organic vehicles, and resin moldings and coatings including thereof have improved transparency and gloss. A wet cake may be used as is for aqueous coating compositions, if necessary.

As a further aspect of the invention, it has been unexpectedly found that the barium sulfate particles in the form of plate, when being surface-treated as above, improve the physical properties of resin compositions. In particular, a resin molding which contains the surface-treated barium sulfate in plate form has improved mechanical strength, especially bending strength, and a coating which contains such barium sulfate has an improved anti-abrasion and anti-chipping properties. These improvements are attainable in particular when barium sulfate is about 0.2–20 microns in the maximum diameter wherein the maximum diameter means herein the maximum diameter on the platelet. The improvements may be due to the layer orientation of barium sulfate plate in the resin compositions. However, particles larger than 20 microns in the maximum diameter are not suitable for use as an extender pigment since such large particles are perceivable as clear aggregates in the composition, and lower the gloss, whereas particles smaller than 0.2 microns in the maximum diameter causes little improvement in physical strength of resin products.

As previously described, the aqueous feed slurry of barium sulfate to be surface-treated may be prepared by any known method. Therefore, the following is only illustrative only. The primary particle size of spherical barium sulfate produced in the aqueous solution reaction is usually controllable by the amount of barium ions or sulfate ions contained in excess in the reaction solution as well as reaction temperatures, concentrations of reactants, stirring, etc. For example, barium sulfate 0.1 micron or less in average particle size may be prepared by the aqueous solution reaction under a vigorous stirring wherein the solution contains barium ions in excess, as is diclosed in Japanese Patent Application No. 54-145951.

On the contrary, barium sulfate in the form of platelet may be prepared, for example, by the stoichiometric reaction of barium sulfide and sulfuric acid at a pH of about 3-6 in an aqueous solution. The primary particle size may also be controllable by reaction conditions such as temperatures, concentrations of reactants and manners and efficiency of stirring during the reaction.

The invention will be more clearly understood with reference to the following examples, which however are intended to illustrate the invention only and are not to be construed as limiting the scope of the invention.

EXAMPLE 1

(a) Preparation of surface-treated barium sulfate

An aqueous solution of sulfuric acid (110 g/l, 20° C.) and an aqueous solution of barium sulfide (120 g/l, 50° C.) were fed to an 850 ml-capacity reaction vessel provided with a stirrer with a rate of 700 l/hour of sulfuric acid solution so that the resulting slurry, under a vigorous stirring, stayed therein for 0.17 seconds in average, and contained barium sulfide in excess in amounts of about 6 g/l, thereby to provide a slurry of spherical barium sulfate of 0.02-0.1 microns in primary particle size and about 0.05 microns in average particle size.

The slurry was divided into two parts, and one of them was filter-pressed and washed, and the resulting wet cake was again suspended in water to provide a slurry containing 500 g/l of barium sulfate. The slurry was then spray-dried and hammer-milled to provide barium sulfate particles as a comparative sample (A).

The other slurry of the two was heated to 70° C., a 10%-aqueous solution of sodium silicate was added thereto in amounts of 20% by weight in terms of silica ($SiO_2$) based on the barium sulfate in the slurry to deposit barium silicate on the barium sulfate. Hydrochloric acid solution was then added to the slurry to adjust it at a pH of 2 to decompose the barium silicate to hydrous silica and the slurry was left standing for 30 minutes for aging followed by the addition thereto a 20%-aqueous solution of sodium hydroxide to adjust the slurry at a pH of 7, and the slurry was aged for 30 minutes. The slurry was then filter-pressed and washed with water, dried with an electric heater, and hammer-milled to provide particles (I) of the invention about 10 microns in average particle size.

For a further comparative example, an aqueous solution of barium sulfide was reacted with an excess amount of sulfuric acid in the same manner as above to provide an aqueous slurry of barium sulfate having a pH of 1 which contained no barium ion. An aqueous sodium hydroxide solution was added to the slurry to adjust it at a pH of 7, and then was added a 10%-aqueous solution of sodium silicate in amounts of 20% by weight in terms of silica based on barium sulfate in the slurry. The resulting slurry was worked up in the same manner as above to provide comparative particles of barium sulfate (B).

(b) Preparation of resin sheet and properties thereof

A compound was prepared which was composed of 100 parts of polyvinylchloride resin, 45 parts of dioctylphthalate, 5 parts of epoxidated soybean oil, 0.7 parts of cadmium stearate and 0.3 parts of barium stearate, all the parts by weight. Each example of barium sulfate particles was added in amounts shown in TABLE 1 in relation to 100 parts by weight of the resin to the compound and kneaded by rolls at a temperature of 125° C. for 7 minutes, and then formed into a sheet. The sheet was then pressed at a temperature of 160° C. for 10 minutes to provide a test sheet 1 mm thick.

The transparency of the test sheet was determined in terms of Hunter L value by a color meter, and the dispersibility of particles therein was determined by counting the number of aggregates perceived by the naked eye. The results are shown in TABLE 1.

TABLE 1

| | Barium Sulfate Added* | | | | |
|---|---|---|---|---|---|
| | 0 | 5 | 10 | 20 | 5 |
| | Hunter L values (%) | | | | Dispersability |
| Comparative A | 94 | 73 | 61 | 43 | some |
| B | 94 | 70 | 56 | 35 | many |
| Invention I | 94 | 88 | 86 | 80 | none |

*Parts by weight in relation to 100 parts by weight of resin.

EXAMPLE 2

(a) Preparation of surface-treated barium sulfate

The aqueous slurry of barium sulfate containing 6 g/l of barium sulfide which was prepared in EXAMPLE 1 was heated to a temperature of 70° C., and was added thereto a 10% aqueous solution of sodium silicate in amounts of 5% by weight in terms of silica based on the weight of barium sulfate in the slurry. To the slurry was added hydrochloric acid to adjust the slurry at a pH of about 4, and the slurry was aged for 30 minutes. Thereafter a 20% aqueous solution of sodium aluminate was added to the slurry in amounts of 10% by weight in terms of alumina ($Al_2O_3$) based on the weight of barium sulfate in the slurry while maintaining the slurry at a pH of about 6 by the addition thereto hydrochloric acid. To the resultant slurry was added a 20% aqueous solution of sodium hydroxide to adjust the slurry at a pH of about 7 followed by a 30-minute aging, to deposit hydrous alumina on the surface of barium sulfate. The slurry was then filtered, washed with water, dried by an electric heater and jet-milled to provide spheric particles of barium sulfate 4 microns in average particle size of the invention (II).

For comparison, the same aqueous slurry as above which contained barium sulfide in excess was made acidic and then the same solution of sodium aluminate used in the above was added to the slurry in amounts of 10% by weight in terms of alumina based on the weight of barium sulfate in the slurry while maintaining it at a pH of about 5 by the addition thereto hydrochloric acid. Thereafter a 20% aqueous solution of sodium hydroxide was added to the slurry to adjust it at a pH of about 7, and then the resultant slurry was left standing for 30 minutes for aging. The slurry was then worked up in the same manner as above to provide a comparative particles of barium sulfate (C) 13 microns in average particle size.

(b) Preparation of coating composition and properties thereof

A resin solution was prepared which was composed of 17.5 parts of baking alkyd resin, 8.9 parts of melamine resin and 4.9 parts of xylene, all in parts by weight. To the resin solution was added 15 parts by weight of a sample of barium sulfate particles and dispersed therein by a paint conditioner, and the size of particles in the resultant dispersion was determined every five minutes by a fineness gauge. The results are shown in TABLE 2. As apparent, the barium sulfate of the invention has an improved dispersibility in the vehicle.

After a 60-minute dispersion, the resultant coating composition was applied on a glass plate by an applicator to form a coating 6 mil thick, dried at room temperature and was then baked at 140° C. for 20 minutes. The 20°/20° gloss and the Hunter L value transparency of the baked film were determined by a gloss meter and a color meter, respectively. The results are shown in TABLE 3.

TABLE 2

| Dispersing Time (min.) | Fineness of Barium Sulfate (microns) | | |
|---|---|---|---|
| | II | C | A |
| 5 | 25 | 35 | 45 |
| 10 | 15 | 25 | 28 |
| 15 | 9 | 18 | 15 |
| 20 | 5 | 15 | 10 |
| 25 | below 5 | 13 | 8 |
| 30 | | 12 | 6 |
| 40 | | 10 | below 5 |
| 50 | | 8 | |
| 60 | | 7 | |

TABLE 3

| | Barium Sulfate | | |
|---|---|---|---|
| | II | C | A |
| Hunter L values (%) | 96 | 92 | 95 |
| 20°/20° Gross | 160 | 98 | 155 |

EXAMPLE 3

(a) Preparation of surface-treated barium sulfate

An aqueous solution of sulfuric acid (1.28 moles/l, 25° C.) and an aqueous solution of barium sulfide (0.74 moles/l, 48° C.) were continuously fed to a 250 l-capacity reaction vessel provided with a stirrer at the rates of 900 l/hour and 1600-1800 l/hour, respectively, so that the reaction mixture stayed in the vessel for 6 minutes in average at temperatures of about 52° C. and had barium ion in excess in amounts of 0.03 moles/l by controlling the feed rate of barium sulfide solution, to provide an aqueous slurry containing spherical particles 0.2 microns in average particle size.

The slurry was divided into four parts. The first slurry was filtered, washed with water, dried and jet-milled to provide a comparative sample of barium sulfate particles (D).

The second slurry was heated to a temperature of 70° C., and was added thereto a 30% aqueous sodium hydroxide solution to adjust it at a pH of about 10. Thereafter an aqueous solution of sodium silicate of the concentration of 100 g/l in terms of silica was added to the slurry in amounts of 1.0% by weight in terms of silica based on the weight of barium sulfate in the slurry and the slurry was stirred for 10 minutes. Then 10% aqueous hydrochloric acid was added to the slurry to adjust it at a pH of about 6 followed by the aging for 30 minutes to deposit hydrous silica on the surface of barium sulfate. The slurry was worked up in the same manner as above to provide particles of barium sulfate of the invention (III).

The third slurry was worked up in the same manner as in the preparation of particles (III) inclusive of the step of aging. Thereafter a 30%-aqueous sodium hydroxide solution was added to the slurry to adjust it at a pH of about 7, and γ-methacryloxypropyltrimethoxysilane was added in amounts of 0.5% by weight based on the weight of barium sulfate followed by a 30 minute aging. The resultant slurry was worked up in the same manner as above to filter, dry and pulverize, thereby to provide particles of barium sulfate of the invention (IV).

The fourth slurry was treated in the same manner as in the preparation of particles (III) to provide a slurry of barium sulfate having a coating of hydrous silica thereon at a pH of about 6. Then an aqueous solution of sodium aluminate was added to the slurry in amounts of 2.0% by weight in terms of alumina based on the weight of barium sulfate in the slurry, and then a 10%-hydrochloric acid was added to adjust the slurry at a pH of about 7 to deposit hydrous alumina on the surface of barium sulfate. The slurry was worked up in the same manner as above to provide particles of barium sulfate of the invention (V).

(b) Preparation of coating compositions and properties thereof

A mixed solvent composed of Solvesso 150, n-butanol and butyl cellosolve (70/20/10 in the weight ratio) was added to a solution of mixed resin of polyester resin and melamine resin (85/15 in the weight ratio) to prepare a resin solution containing the resins in 50% by weight.

Each of the barium sulfates obtained above or commerically available titanium dioxide having a silica-alumina coating thereon and average particle size of 0.3 microns was added to the resin solution in amounts shown in TABLE 4 together with carbon black to provide a coating composition. Each coating composition was adjusted to have a proper viscosity and applied on a zinc phosphate-treated steel plate by a spray to form a coating 30 microns thick. The coating was then baked at a temperature of 160° C. for 30 minutes to form a film.

The mechanical strength of the film in terms of Erichsen value (JIS Z 2247 A-method) and shock resistance (JIS K 5400-6.13), pencil hardness (JIS K 5400-6.14) and 20°/20° specular gloss were determined, and the results are shown in TABLE 4. As apparent, the film from the coating composition which contains barium sulfate of the invention is comparable with or superior to the film from the composition containing titanium dioxide in the gloss, strength and hardness whereas the film from the compositions which contain the comparative particles of barium sulfate is inferior to the above films in such properties.

TABLE 4

| Compositions* | Coating Compositions | | | | |
|---|---|---|---|---|---|
| | a | b | c | d | e |
| Resin solution | 100 | 100 | 100 | 100 | 100 |
| Barium sulfate III | 20 | | | | |
| IV | | 20 | | | |
| V | | | 20 | | |
| D | | | | 20 | |
| Titanium dioxide | 20 | 20 | 20 | 20 | 40 |
| Carbon black | 0.35 | 0.35 | 0.35 | 0.35 | 0.7 |
| Properties | | | | | |
| 20°/20° Gross | 77 | 80 | 81 | 70 | 78 |
| Pencil hardness | 3 H | 3 H | 3 H | 2 H | 3 H |
| Erichsen values (mm) | 5.1 | 5.3 | 5.4 | 4.8 | 5.2 |
| Shock resistance (cm) | 40 | 40 | 40 | 35 | 40 |

*Parts by weight

EXAMPLE 4

(a) Preparation of surface-treated barium sulfate

An aqueous solution of sulfuric acid (125 g/l, 20° C.) was fed to a 250 l-capacity reaction vessel provided with a stirrer at a rate of 200 l/hr together with an aqueous solution of barium sulfide (125 g/l, 50° C.) so that the reaction mixture in the vessel had a pH of about 4 by controlling the feed rate of barium sulfide solution to provide an aqueous slurry of barium sulfate in the form of plate 5 microns long, 5 microns wide and 0.5 microns thick in average.

The thus prepared slurry was divided into five parts. The first slurry was filter-pressed to provide a wet cake, and the cake after drying was hammer-milled to provide a comparative sample of barium sulfate particles (E).

In the second slurry was dissolved barium sulfide in amounts of 0.5 mole % based on the barium sulfate in the slurry, and the resultant slurry was heated to a temperature of 70° C. Thereafter a 10% aqueous solution of sodium silicate was added to the slurry in amounts of 1.0% by weight in terms of silica based on the weight of barium sulfate in the slurry to deposit barium silicate on the barium sulfate. Then to the slurry was added hydrochloric acid to adjust the slurry at a pH of about 2 to decompose barium silicate on the barium sulfate to hydrous silica. After a 30 minute aging, a 30% aqueous sodium hydroxide solution was added to the slurry to adjust it at a pH of about 7. Then the slurry was filtered, washed, dried and pulverized to provide particles of barium sulfate of the invention (VI).

The third slurry was treated in the same manner as in the preparation of particles (VI) to form a coating of hydrous silica on barium sulfate. To the resultant slurry at a pH of about 7 was added γ-methacryloxypropyltrimethoxysilane in amounts of 0.3% by weight based on the weight of barium sulfate in the slurry. After a 30 minute aging, the slurry was worked up in the same manner as above to provide particles of barium sulfate of the invention (VII).

The fourth slurry was treated in the same manner as above to form a slurry of barium sulfate having a coating of hydrous silica. Then a 30% aqueous solution of sodium hydroxide was added to the slurry to adjust the slurry at a pH of about 6, and was added thereto an aqueous solution of sodium aluminate in amounts of 1.0% by weight in terms of alumina based on the weight of barium sulfate in the slurry followed by the addition of hydrochloric acid to adjust the slurry at a pH of about 7 to deposit alumina on the surface of barium sulfate. The slurry was then worked up in the same manner as above to provide particles of barium sulfate of the invention (VIII).

For the preparation of another comparative sample of barium sulfate particles, an aqueous sodium hydroxide solution was added to the fifth slurry to adjust the slurry at a pH of about 7, and there was added thereto the same silane coupling agent as used above in the same amount followed by a 30 minute aging. Then the slurry was worked up in the same manner as above to provide a comparative sample of particles (F).

(b) Preparation of resin moldings and properties thereof 10 parts by weight of each barium sulfate obtained above and 80 parts by weight of isotactic polypropylene were mixed in a Henschel mixer, granulated and injection-molded to a test molding. The mechanical strength of the molding (JIS K 6758) are shown in TABLE 5. As apparent, the moldings which contain barium sulfate of the invention have larger bending moduli and Izod impact values than the moldings which contain the comparative barium sulfate particles.

(c) Preparation of coating compositions and properties thereof

To 100 parts of the same resin solution as used in EXAMPLE 3 (b) was added 10 parts of each barium sulfate, 0.7 parts of carbon black and 40 parts of titanium dioxide, all the parts by weight, and dispersed therein to provide a coating composition. The composition, after being adjusted in viscosity, was applied on a zinc phosphate-treated steel plate, and baked also in the same manner as above to form a film. The Erichsen value and shock resistance (JIS K 5400-6.13) were determined and the results are shown in TABLE 5.

As apparent, the film from the coating composition which contains barium sulfate of the invention has an improved mechanical strength.

TABLE 5

| | Barium Sulfate | | | | |
|---|---|---|---|---|---|
| | VI | VII | VIII | E | F |
| Resin moldings | | | | | |
| Bending modulus (kg/cm) | 22000 | 24630 | 23500 | 16500 | 16700 |
| Izod impact values | 130 | 140 | 135 | 91 | 90 |
| Coating films | | | | | |
| Shock resistance (cm) | 35 | 40 | 35 | 30 | 30 |
| Erichsen values (mm) | 5.5 | 6.2 | 5.8 | 4.5 | 4.7 |

What is claimed is:

1. A method of producing surface-treated barium sulfate which comprises:
   adding an aqueous solution of an alkali silicate to an aqueous feed slurry of barium sulfate which contains barium ions in excess, the alkali silicate being added in amounts of 0.1-30% by weight in terms of silica based on the weight of barium sulfate in the slurry, to deposit barium silicate on the surface of barium sulfate in the slurry,
   and then adding a meneral acid to the resultant slurry and adjusting it at a pH not greater than about 7 to decompose the barium silicate to hydrous silica.

2. The method as claimed in claim 1 wherein barium sulfate in the feed slurry is spherical and not more than about 0.5 microns in average primary particle size.

3. The method as claimed in claim 1 wherein barium sulfate in the feed slurry is in the form of plate and about 0.2–20 microns in the maximum diameter.

4. The method as claimed in claim 1 wherein the feed slurry contains barium ion in amounts of about 0.1–20 mole % based on barium sulfate in the slurry.

5. The method as claimed in claim 1 wherein the alkali silicate is sodium silicate, potassium silicate or a mixture thereof.

6. The method as claimed in claim 1 which includes further steps of adding an aqueous solution of a water-soluble metal compound to the aqueous slurry of barium sulfate having hydrous silica thereon, the metal compound being added in amounts of about 0.1–30% by weight in terms of the weight of anhydrous oxide of the metal based on the weight of barium sulfate in the slurry, and then adjusting the slurry at a pH so as to decompose the metal compound to water-insoluble hydrous oxide of the metal and to deposit the hydrous oxide of the metal on the surface of barium sulfate.

7. The method as claimed in claim 6 wherein the water-soluble metal compound is at least one compound selected from the group consisting of water-soluble sulfates, basic sulfates, complex salts, halides and nitrates of a metal which is selected from the group consisting of magnesium, aluminum, zinc, zirconium and titanium.

8. The method as claimed in claim 7 wherein the water-soluble metal compound is sodium aluminate.

9. The method as claimed in claim 1 which includes a further step of treating barium sulfate having hydrous silica thereon with a silane coupling agent.

10. The surface-treated barium sulfate produced by the method of claim 1.

11. The surface-treated barium sulfate produced by the method of claim 6.

12. The surface-treated barium sulfate produced by the method of claim 9.

* * * * *